US006241184B1

(12) United States Patent

Sunne et al.

(10) Patent No.: US 6,241,184 B1
(45) Date of Patent: Jun. 5, 2001

(54) VEHICLE HAVING A CERAMIC RADOME JOINED THERETO BY AN ACTIVELY BRAZED COMPLIANT METALLIC TRANSITION ELEMENT

(75) Inventors: Wayne Sunne; Edward Liguori; Oscar O Hanian, all of Tucson, AZ (US)

(73) Assignee: Raytheon Company, Lexington, MA (US)

( * ) Notice: Subject to any disclaimer, the term of this patent is extended or adjusted under 35 U.S.C. 154(b) by 0 days.

(21) Appl. No.: 08/711,637

(22) Filed: Sep. 10, 1996

(51) Int. Cl.[7] .............................. B64C 1/06; B64D 7/00; H01Q 1/42

(52) U.S. Cl. ...................... 244/117 A; 244/131; 244/133; 244/121; 244/158 A; 343/872

(58) Field of Search .......................... 89/1, 817; 244/131, 244/132, 133, 120, 117 A, 117 R, 158 A, 121; 343/872

(56) References Cited

U.S. PATENT DOCUMENTS 2,937,597 * 5/1960 Winn et al. .......................... 102/105
3,177,811 * 4/1965 Baylor et al. .................... 244/158 R
3,336,872 * 8/1967 Langen et al. .................... 244/158 A
3,970,006 * 7/1976 Copeland et al. ............... 244/117 A
4,031,806 * 6/1977 Stark et al. ....................... 244/158 A
4,702,439 * 10/1987 Kelley et al. .................... 244/158 A
4,867,357 * 9/1989 Inglis et al. .......................... 244/121
5,372,333 * 12/1994 Uwira et al. ..................... 244/117 A
5,407,119 * 4/1995 Churchill et al. ................. 228/124.5
5,691,736 * 11/1997 Hunn et al. .......................... 343/872

* cited by examiner

*Primary Examiner*—Virna Lissi Mojica
(74) *Attorney, Agent, or Firm*—David W. Collins; Leonard A. Alkov; Glenn H. Lenzen

(57) ABSTRACT

A missile has a body with a substantially circular nose opening therein, and a ceramic radome sized to cover the nose opening. A compliant metallic circular transition element is disposed structurally between the radome and the body. The transition element includes an elongated compliant arm region and an upper crossbar region positioned adjacent to the radome such that the lower margin surface of the radome is adjacent to an upper side of the crossbar region. A brazed butt joint is formed between the lower margin surface of the radome and the upper side of the crossbar region of the transition element. A second brazed butt joint is formed between the vehicle body and the lower side of a lower crossbar region joined to the arm region. The brazed joints are formed with a single active braze alloy which permits the entire joining operation to be accomplished in a single furnace cycle.

16 Claims, 2 Drawing Sheets

VEHICLE HAVING A CERAMIC RADOME JOINED THERETO BY AN ACTIVELY BRAZED COMPLIANT METALLIC TRANSITION ELEMENT

This invention relates to a vehicle having a ceramic radome, and, more particularly, to the attachment of the ceramic radome to the vehicle.

Outwardly looking radar, infrared, and/or visible-light sensors built into vehicles such as aircraft or missiles are usually protected by a covering termed a radome. The radome serves as a window that transmits the radiation sensed by the sensor. It also acts as a structural element that protects the sensor and carries aerodynamic loadings. In many cases, the radome protects a forward-looking sensor, so that the radome must bear large aerostructural loadings.

Where the vehicle moves relatively slowly, as in the case of helicopters, subsonic aircraft, and ground vehicles, some radomes are made of nonmetallic organic materials which have good energy transmission and low signal distortion, and can support small-to-moderate structural loadings at low-to-intermediate temperatures. For those vehicles that fly much faster, such as hypersonic aircraft or missiles flying in the Mach 3–20 range, nonmetallic organic materials are inadequate for use in radomes because aerodynamic friction heats the radome above the maximum operating temperature of the inorganic material.

In such cases, the radome is made of a ceramic material that has good elevated temperature strength and good energy transmission characteristics. Existing ceramics have the shortcoming that they are relatively brittle and easily fractured. The likelihood of fracture is increased by small surface defects in the ceramic and externally imposed stresses and strains. The ceramic radome is hermetically attached to the body of the missile, which is typically made of a metal with high-temperature strength, such as a titanium alloy.

The ceramic has a relatively low coefficient of thermal expansion ("CTE"), and the metal missile body has a relatively high CTE. When the missile body and radome are heated, the resulting CTE-mismatch strain between the radome and the missile body can greatly increase the propensity of the radome to fracture in a brittle manner, leading to failure of the sensor and failure of the missile. Such heating can occur during the joining operation, when the missile is carried on board a launch aircraft, or during service.

There is a need for an approach to the utilization of ceramic radomes in vehicles, particularly high-speed missiles, wherein the tendency to brittle fracture and radome failure is reduced. The present invention fulfills this need, and further provides related advantages.

SUMMARY OF THE INVENTION

The present invention provides a vehicle, such as a missile, having a ceramic radome affixed to the vehicle body. The attachment structure is such that the thermal straining in the radome due to thermal expansion coefficient differences is reduced or avoided. The attachment structure itself does not tend to cause premature failure in the ceramic material, as has been the case for some prior attachment approaches. The attachment may be hermetic if desired, so that the delicate sensor is protected against external environmental influences, as well as aerodynamic and aerothermal loadings. The attachment is accomplished economically, because in the preferred embodiment the two braze joints are formed simultaneously in a single brazing cycle.

In accordance with the invention, a vehicle having a ceramic radome comprises a vehicle body having an opening therein, a ceramic radome sized to cover the opening of the vehicle body, and an attachment structure joining the radome to the vehicle body to cover the opening. The attachment structure includes a compliant metallic transition element disposed structurally between the radome and the body, and having a first end and an oppositely disposed second end. There is a first butt-joint attachment between the radome and the first end of the transition element, and a second butt-joint attachment between the vehicle body and the second end of the transition element. In this context, a butt joint where loads are transferred in tension is to be contrasted with a lap joint, where loads are transferred in shear.

The butt-joints are preferably made by brazing, most preferably using an active braze alloy. The use of the expensive active braze alloy is typically required for the ceramic-to-metal seal of the radome to the transition element. It is not required for the metal-to-metal seal of the transition element to the vehicle body. However, in this case it is preferred to use the active braze alloy in the metal-to-metal seal because the active braze alloy flows only sluggishly at the brazing temperature and therefore does not flow from its initially established position in the second butt joint.

The transition element is in the form of a ring for the preferred case of the circular nose opening. In cross section, the transition element is preferably an "I" beam having a web section that operates as a compliant arm region to absorb thermally induced strains, an upper crossbar region, and a lower crossbar region which is typically of different length than the upper crossbar region. Optionally, a centering lip extends upwardly from an inside end of the upper crossbar region toward the radome and adjacent to the inside surface of the radome. The lower margin surface of the radome is adjacent to an upper side of the upper crossbar region of the "I" beam. The centering lip serves to align the radome but does not enter into the attachment function. A brazed first butt joint, preferably made of an active brazing alloy, lies between the lower margin surface of the radome and the upper side of the upper crossbar region of the transition element, but it does not lie between the centering lip and the inside surface of the radome. A brazed second butt joint lies between the vehicle body and a lower side of the lower crossbar region of the transition element.

The compliant arm of the transition element flexes outwardly and inwardly to accommodate thermal coefficient mismatch strains, which result from heating and cooling of the vehicle body and radome during processing and service. The continuous transition element structure and brazed attachments provide a strong, hermetic, and compliant support for the radome.

Lap joints are often used for joining structural elements in other applications, because they spread structural loadings over large areas to reduce the incidence of joint failures. However, the lap joint has the undesirable effect of reducing the side-look angle of the sensor. For a sapphire radome having a crystallographic c-axis lying generally perpendicular to the lower margin surface of the radome, a lap joint made to the sides of the radome may also induce premature cracking and failure of the sapphire material.

In the present approach, the carefully made first butt joint between the lower margin surface of the ceramic radome and the upper side of the upper crossbar region of the transition element provides a strong, hermetic structural bond. The butt joint is preferably made by brazing, most preferably with an active braze material. The second butt joint between the lower side of the lower crossbar region and the portion of the opening of the vehicle body that faces (but is spaced apart from) the lower margin surface of the radome provides sufficient strength but does not adversely limit the length of the web section available to flex to absorb thermally induced strains.

The present approach provides an attachment of the ceramic radome to the vehicle body that is strong and hermetic, and minimizes the effects of thermal expansion coefficient mismatches. The attachment approach does not weaken the ceramic material. Other features and advantages of the present invention will be apparent from the following more detailed description of the preferred embodiment, taken in conjunction with the accompanying drawings, which illustrate, by way of example, the principles of the invention. The scope of the invention is not, however, limited to this preferred embodiment.

DETAILED DESCRIPTION OF THE INVENTION

Figure 1:
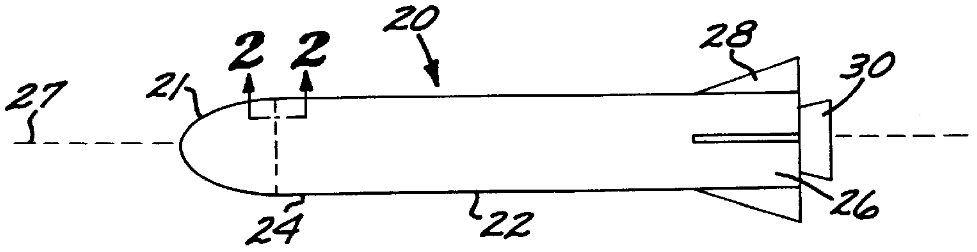
FIG. 1 is an elevational view of a missile with an attached radome.

FIG. 1 depicts a vehicle, here illustrated as a missile 20, having a radome 21 attached thereto. The radome 21 is forwardly facing as the missile flies and is therefore provided with a generally ogival shape that achieves a compromise between good aerodynamic properties and good radiation transmission properties. The missile 20 has a missile body 22 with a forward end 24 and a rearward end 26 and a body axis 27. The missile body 22 is generally cylindrical, but it need not be perfectly so. Movable control fins 28 and an engine 30 (a rearward portion of which is visible in FIG. 1) are supported on the missile body 22. Inside the body of the missile are additional components that are not visible in FIG. 1, are well known in the art, and whose detailed structures are not pertinent to the present invention, including, for example, a seeker having a sensor, a guidance controller, motors for moving the control fins, a warhead, and a supply of fuel.

Figure 2:
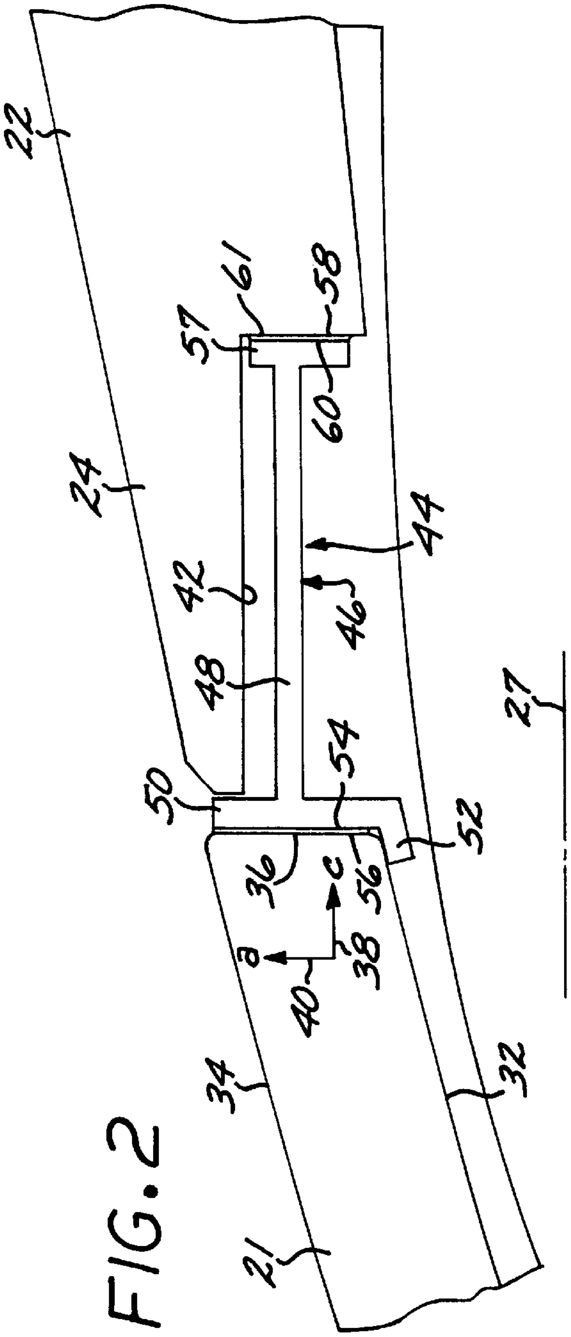
FIG. 2 is a schematic enlarged sectional view of the missile of FIG. 1, taken along line 2—2 in a radome attachment region.

FIG. 2 illustrates a region at the forward end 24 of the missile body 22, where the radome 21 attaches to the missile body 22. The radome 21 has an inside surface 32, an outside surface 34, and a lower margin surface 36 extending between the inner surface 32 and the outer surface 34. The lower margin surface 36 is generally perpendicular to the body axis 27. The radome 21 is made of a ceramic material. Preferably, the radome 21 is made of sapphire, a form of aluminum oxide. For structural reasons, the radome 21 is preferably fabricated with a crystallographic c-axis 38 of the sapphire generally (but not necessarily exactly) perpendicular to the margin surface 36. Thus, in the region of the radome 21 near to the margin surface 36, the crystallographic a-axis 40 of the sapphire is generally (but not necessarily exactly) perpendicular to the inner surface 32 and to the outer surface 34.

The most forward end of the missile body 22 defines a nose opening 42, which in this case is substantially circular because the missile body is generally cylindrical. An attachment structure 44 joins the radome 21 to the missile body 22 in order to cover and enclose the opening 42. The attachment structure includes a compliant metallic transition element 46. The transition element 46 has the form of a ring that extends around the entire opening 42, but is shown in section in FIG. 2.

In section, the transition element 46 preferably has the general shape of an "I"-beam, which may be regular or, as shown, irregular in shape. An elongated compliant arm region 48 extends generally parallel to the body axis 27 of the missile 20. An upper crossbar region 50 extends perpendicular to the arm region 48 and thence generally perpendicular to the body axis 27. Optionally but preferably, a centering lip 52 extends from one end of the crossbar region 50, here the end adjacent to the inside surface 32 of the radome 21, upwardly toward the radome 21 and adjacent to the inside surface 32 of the radome 21. When the radome 21 is assembled to the body 22 and the transition element 46, the centering lip 52 positions the radome exactly in a symmetrical position. The arm region 48 and the crossbar region 50 preferably extend completely around the circumference of the ring of the transition element 46. The centering lip 52 may be either continuous or discontinuous in the form of short tabs.

The radome 21 is joined to the transition element 46 at a first attachment. The first attachment is preferably a brazed first butt joint 54 between an upper surface 56 of the crossbar region 50 of the transition element 46 and the lower margin surface 36 of the ceramic radome 21. The brazed butt joint 54 is preferably formed using an active brazing alloy which chemically reacts with the material of the radome 21 during the brazing operation.

In forming this butt joint 54, care is taken that the brazing alloy contacts only the lower margin surface 36 of the radome 21, and not its inside surface 32 or its outside surface 34. There is no brazed bond formed between the centering lip 52 (where present) and the radome 21. The molten form of the active brazing alloy used to form the butt joint 54 can damage the inside surface 32 and the outside surface 34 of the radome, which lie perpendicular to the crystallographic a-axis of the sapphire material. The lower margin surface 36, which lies perpendicular to the crystallographic c-axis of the sapphire material, is much more resistant to damage by the active brazing alloy. The use of the butt joint to the margin surface of the sapphire radome thus minimizes damage to the sapphire material induced by the attachment approach.

The use of a butt joint to join the radome to the transition element is to be contrasted with the more common approach for forming joints of two structures, a lap or shear joint. In this case, the lap joint would be undesirable for two reasons. The first, as discussed in the preceding paragraph, is that the lap joint would necessarily cause contact of the brazing alloy to the inside and/or outside surfaces of the radome, which are more sensitive to damage by the molten brazing alloy. The second is that the lap or shear joint would extend a distance upwardly along the inside or outside surface of the radome, reducing the side-viewing angle for the sensor that is located within the radome. That is, the further the opaque lap joint would extend along the surface of the radome, the less viewing angle would be available for the sensor. In some applications, this reduction of the side-viewing angle would be critical.

A lower crossbar region 57 extends perpendicular to the arm region 48 and thence generally perpendicular to the body axis 27, at the opposite end of the arm region 48 from the upper crossbar region 50. The transition element 46 is joined to the opening 42 of the missile body 21 at a second attachment. The second attachment includes a brazed second butt joint 58 between a lower side 60 of the lower crossbar region 57 and a facing portion 61 of the material on the surface of the opening 42 of the missile body 21, which in this case is an internal shoulder on the opening 42. The facing portion 61 faces and is adjacent to the lower side 60 of the lower crossbar region 57, and it also faces but is spaced apart from the lower margin surface 36. A brazed second butt joint is used for this second attachment. The use of the butt joint, together with the selection of the braze material, ensures that no braze material flows upwardly to bridge between the opening 42 and the arm region 48. If such bridging were to occur, it would interfere with the flexing function of the arm region.

The second butt joint 58 is formed with an active braze alloy, preferably the same active braze alloy as used for the first butt joint 54. The use of an active braze alloy is not required for the second butt joint, as it is a metal-to-metal joint that may be made with a non-active braze alloy. However, in this case the second butt joint 58 is made of the active braze alloy, whose flow is sluggish at the brazing temperature. The sluggish flow of the braze alloy at the first butt joint 54 ensures that braze metal will not flow to the inner surface 32 and outer surface 34 of the ceramic radome 21. The sluggish flow of the braze alloy at the second butt joint 58 ensures that braze metal will not flow up the arm region 48, bridge across the opening 42, and later solidify and interfere with the flexing of the arm region.

The missile body 22 is preferably made of a metal such as a titanium alloy. The titanium alloy of the missile body 22 and the sapphire of the radome 21 have different coefficients of thermal expansion (CTE). When the missile 20 is heated and cooled during fabrication or service, the difference in thermal expansion coefficients causes the total expansion of the radome 21 and the missile body 22 to be different. This difference would ordinarily produce thermally induced stresses in the radome and the missile body. The thermally induced stresses have small effects on the missile body structure, but they can produce significant damage and reduction in failure stress in the ceramic material of the radome 21. The present approach of the transition element avoids or minimizes such thermally induced stresses.

The transition element 46 is made of a metal or metallic alloy. The arm region 48 is made relatively thin, so that it cam bend and flex to accommodate differences in the coefficients of thermal expansion of the missile body 22 and the radome 21. Stated alternatively, the thermally induced stresses are introduced into the free portion of the arm region 48 of the transition element 46 and not into the radome 21.

Figure 3:
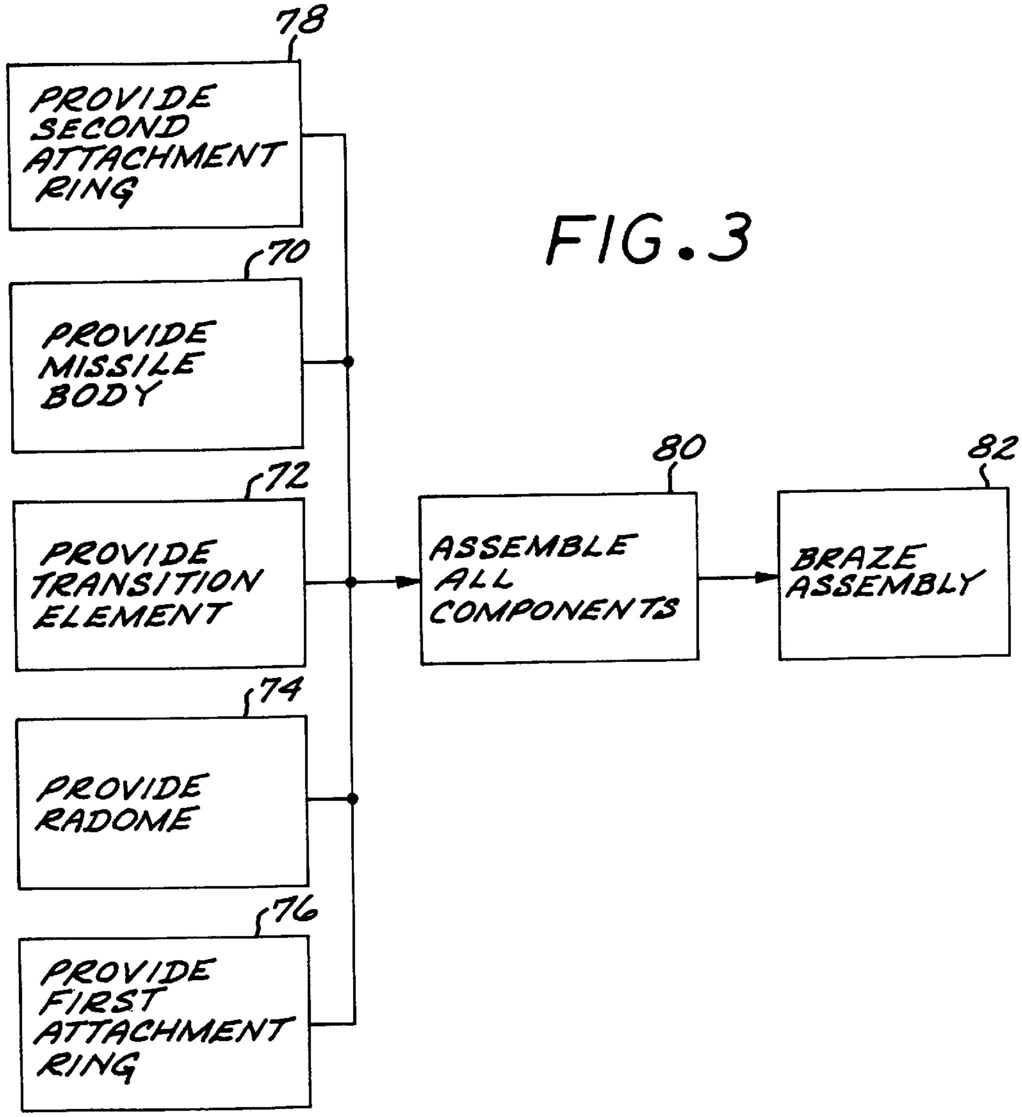
FIG. 3 is a block flow diagram for a method of preparing the missile of FIG. 1 and 2.

FIG. 3 depicts an approach for fabricating the missile 20 having the radome 21 joined to the missile body 22. The missile body 22 is provided, numeral 70. The portion of the missile body 22 that forms the opening 42 is preferably a titanium alloy such as Ti—6Al—4V, having a composition, in weight percent, of 6 percent aluminum, 4 percent vanadium, balance titanium.

The transition element 46 is provided, numeral 72. The transition element 46 is preferably a niobium-based alloy having a composition, in weight percent, of 1 percent zirconium, balance niobium. Other metallic materials may be used for the transition element, such as, for example, tantalum, tantalum-tungsten, or KOVAR. The niobium-based alloy is preferred because it is readily available, is easily machined, and has a coefficient of thermal expansion relatively close to that of the preferred radome material, sapphire.

The ceramic radome 21, preferably made of sapphire, is provided, numeral 74. The sapphire radome is typically in the form of an oriented polycrystal with the c-axis of the sapphire oriented substantially perpendicular to the lower margin surface 36.

Figure 4:
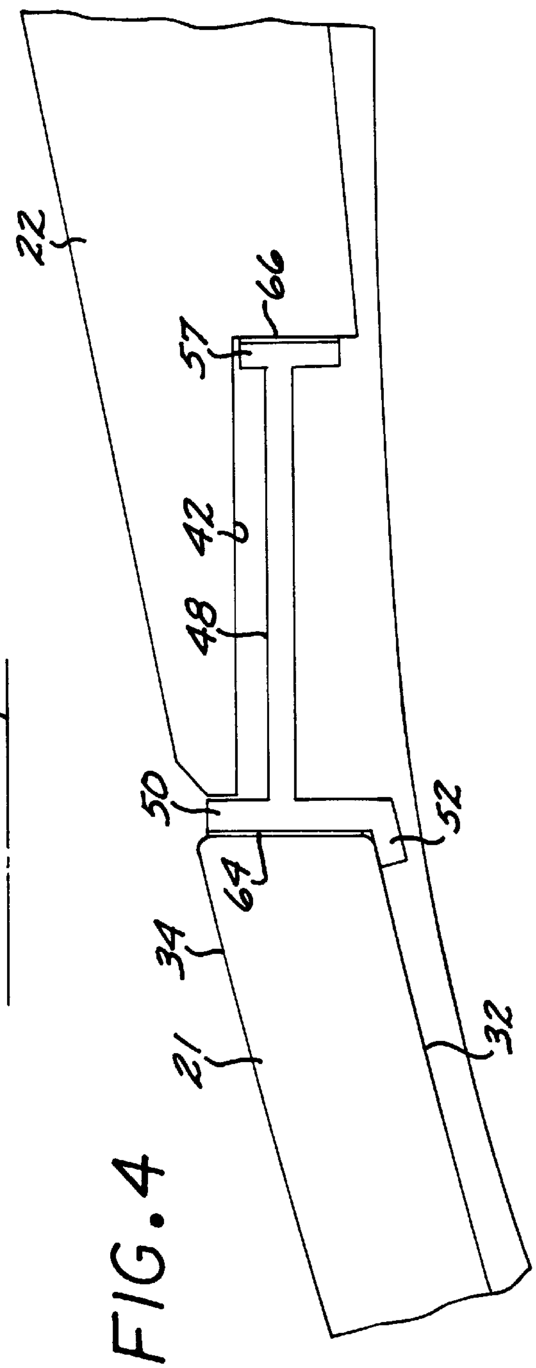
FIG. 4 is a schematic enlarged sectional view like FIG. 2, showing the positioning of the braze alloy pieces.

A first braze ring 64, illustrated in FIG. 4, is provided, numeral 76. The first braze ring 64 is a washerlike ring of braze material that is sized to fit between the lower margin surface 36 and the upper surface 56 of the upper crossbar region 50. Care is taken such that the volume of the first braze ring 64, which is readily determined by its thickness, is not so large that, upon melting, the braze metal is extruded and runs along the inner surface 32 and the outer surface 34 of the radome 21. In a preferred case, where the diameter of the first braze ring 64 is about 2.9 inches, its thickness is about 0.002 inches and its width is about 65 percent of that of the lower margin surface 36.

A second braze ring 66, also illustrated in FIG. 4, is provided, numeral 78. The second braze ring 66 is a washerlike ring of braze material that is sized to fit between the lower side 60 of the lower crossbar region 57 and the facing portion 61 of the opening 42. As with the first braze ring, care is taken such that the volume of the second braze ring 66, which is readily determined by its thickness, is not so large that, upon melting, the braze metal is extruded and runs along the arm region 48 so as to potentially bridge between the arm region and the opening 42. In a preferred case, where the diameter of the second braze ring 66 is about 2.9 inches, its thickness is about 0.002 inches and its width is about 65 percent of that of the lower side 60 of the lower crossbar region 57.

The first braze alloy used to make the first braze ring 64 and the second braze alloy used to make the second braze ring 66 are preferably both active braze alloys, and most preferably are the same active braze alloy. An active braze alloy is a braze alloy containing a reactive element, such as titanium or zirconium, which chemically reacts with the articles being brazed and also wets the articles being brazed. (By contrast, a non-active braze alloy wets the articles being brazed, sometimes only with difficulty, but does not chemically react with them to form a reaction product.) The active braze alloy desirably has the additional characteristic that it flows only sluggishly at the braze temperature, so that it has little tendency to run and flow from its originally sited position. That is, the active braze alloy does not tend to flow into areas where it is not initially sited and is not desired, such as the surfaces 32 and 34 and along the arm region 48. This result is an important advantage for the present technology.

The preferred active braze alloy is Incusil aba, a commercially available alloy having a composition, in weight percent, of about 27.25 percent copper, 12.5 percent indium, 1.25 percent titanium, balance silver, and a brazing temperature of about 1300° F. In the most preferred approach, the alloy is fabricated into appropriately sized rings 64 and 66.

The missile body 22, second braze ring 66, transition ring 46, first braze ring 64, and radome 21 are assembled together, numeral 80, and held together in place with tooling.

The first and second attachments are accomplished simultaneously in a single brazing cycle, numeral 82. The brazing is accomplished by heating the assembly to a brazing temperature sufficient to melt the braze alloy and cause it to flow freely, about 1300° F. The brazing is accomplished in a vacuum of about $10^{-6}$ atmosphere or less and with a temperature cycle involving a ramping up from room temperature to the brazing temperature of about 1300° F. for the preferred Incusil aba brazing material, a hold at the brazing temperature for 15 minutes, and a ramping down to ambient temperature, the total cycle time being about 6 hours. Upon heating, the brazing alloy melts and flows into the regions 54 and 58. The temperature is thereafter reduced to below the melting temperature of the braze alloy, so that the flowed braze alloy solidifies and forms the butt joints 54 and 58.

The ability to accomplish both the first and second attachments in a single brazing operation is a distinct advantage. There is less exposure of the components to elevated temperature than if two cycles were used, so that there is less chance of error and less likelihood of structural changes in the components. The cost of performing a single six-hour brazing cycle is half that of performing two such cycles, which would probably be required if two different brazing alloys were used.

The two butt joints 54 and 58 are preferably braze joints, as illustrated. The braze joints are preferred because they form a hermetic seal for the attachment structure 44. The hermetic seal prevents atmospheric contaminants from penetrating into the interior of the missile body during storage. It also prevents gasses and particulate material from penetrating into the interior of the missile body during service. Other operable joints may be used as well.

Although a particular embodiment of the invention has been described in detail for purposes of illustration, various modifications and enhancements may be made without departing from the spirit and scope of the invention. Accordingly, the invention is not to be limited except as by the appended claims.

What is claimed is:

1. A vehicle having a ceramic radome, comprising:

a vehicle body having an opening therein;

a radome made of a ceramic material and sized to cover the opening of the vehicle body; and an attachment structure joining the ceramic of the radome to the vehicle body to cover the opening, the attachment structure comprising a compliant metallic transition element disposed structurally between and joined to the ceramic of the radome and the body, the transition element having a first end and an oppositely disposed second end;

a first butt-joint attachment between the ceramic of the radome and the first end of the transition element, and a second attachment between the vehicle body and the second end of the transition element.

2. The vehicle of claim 1, wherein the vehicle body is a nose of a missile.

3. The vehicle of claim 1, wherein the radome is made of sapphire.

4. The vehicle of claim 1, wherein the opening is substantially circular, wherein the radome has a substantially circular base sized to join to the opening, and wherein the transition element is a ring disposed between the opening and the base of the radome.

5. A vehicle having a ceramic radome, comprising:

a vehicle body having an opening therein;

a ceramic radome sized to cover the opening of the vehicle body; and an attachment structure joining the radome to the vehicle body to cover the opening, the attachment structure comprising a compliant metallic transition element disposed structurally between the radome and the body, the transition element having a first end and an oppositely disposed second end;

a first butt-joint attachment between the radome and the first end of the transition element, and a second butt-joint attachment between the vehicle body and the second end of the transition element, wherein the transition element has a cross section with a compliant arm region, an upper crossbar region extending transversely to a first end of the arm region and affixed thereto, and a lower crossbar region extending transversely to a second end of the arm region and affixed thereto, and wherein a top of the upper crossbar region is affixed to the radome by the first butt-joint attachment and an oppositely disposed bottom of the lower crossbar region is affixed to a facing portion of the vehicle by the second butt-joint attachment.

6. The vehicle of claim 1, wherein the first attachment and the second attachment are brazed joints.

7. The vehicle of claim 1, wherein the first attachment and the second attachment each comprise an active braze material.

8. A vehicle having a ceramic radome, comprising:

a metallic missile body having a substantially circular nose opening therein;

a ceramic radome sized to cover the nose opening, the radome having an outside surface, an inside surface, and a lower margin surface extending between the outside surface and the inside surface;

a compliant metallic circular transition element disposed structurally between the radome and the body, wherein the transition element includes an elongated compliant arm region, an upper crossbar region extending transversely to the arm region and positioned adjacent to the radome such that the lower margin surface of the radome is adjacent to an upper side of the upper crossbar region, and a lower crossbar region extending transversely to the arm region and positioned adjacent to the nose opening such that a lower side of the lower crossbar region is adjacent to a facing portion of the missile body having a facing but spaced apart relationship to the lower margin surface of the radome;

a first brazed butt joint between the lower margin surface of the radome and the upper side of the upper crossbar region of the transition element, the first brazed joint comprising a first active braze material; and a second brazed butt joint between the vehicle body and the lower side of the lower crossbar region, the second brazed joint comprising a second active braze material.

9. The vehicle of claim 8, wherein the radome is made of sapphire.

10. The vehicle of claim 8, wherein the radome is made of sapphire having a crystallographic c-axis oriented substantially perpendicular to the margin surface.

11. The vehicle of claim 8, wherein the transition element further includes a centering lip extending upwardly from an end of the upper crossbar region toward the radome, the centering lip serving to align the radome with the transition element but not being affixed to the radome.

12. The vehicle of claim 8, wherein the first active braze material and the second active braze material have the same composition.

13. The vehicle of claim 12, wherein the braze material has a composition, in weight percent, of about 27.25 percent copper, 12.5 percent indium, 1.25 percent titanium, balance silver.

14. A vehicle having a ceramic radome, comprising:

a metallic missile body having a substantially circular nose opening therein;

a sapphire radome sized to cover the nose opening, the radome having an outside surface, an inside surface, and a lower margin surface extending between the outside surface and the inside surface, the sapphire having a crystallographic c-axis oriented substantially perpendicular to the margin surface;

a compliant metallic circular transition element disposed structurally between the radome and the body, wherein the transition element has the shape of an I-beam and includes an elongated compliant arm region, an upper crossbar region joined to a first end of the arm region and positioned adjacent to the radome such that the lower margin surface of the radome is adjacent to an upper side of the upper crossbar region, a centering lip extending upwardly from an inside end of the crossbar region toward the radome and adjacent to the inside surface of the radome, the centering lip serving to align the radome, and a lower crossbar region base joined to a second end of the arm region and oppositely disposed to the upper crossbar region;

a first brazed butt joint between the lower margin surface of the radome and the upper side of the upper crossbar region of the transition element, but not between the centering lip and the inside surface of the radome, the brazed butt joint being formed of an active brazing alloy; and a second brazed butt joint between the lower side of the lower crossbar region and a portion of the vehicle body that faces toward but is spaced apart from the lower margin surface of the radome.

15. The vehicle of claim 14, wherein the first brazed butt joint and the second brazed butt joint are each formed of an active brazing alloy having a composition, in weight percent, of about 27.25 percent copper, 12.5 percent indium, 1.25 percent titanium, balance silver.

16. A method for preparing a vehicle having a ceramic radome affixed thereto, comprising the steps of:

providing a vehicle body having an opening therein;

providing a radome made of a ceramic and sized to cover the opening of the vehicle body; and affixing the ceramic radome to the vehicle body using a compliant metallic transition element disposed structurally between and joined to the ceramic of the radome and the body, the step of affixing including the steps of providing a metallic transition element extending between the ceramic of the radome and the vehicle body, the transition element having a first butt joint relation to the ceramic of the radome and a second butt joint relation to the vehicle body, positioning a first portion of an active braze material between the transition element and the ceramic of the radome at the first butt joint and a second portion of the same active braze material between the transition element and the vehicle body at the second butt joint, and brazing the metallic transition element to the vehicle body and to the ceramic of the radome in a single cycle of heating to a brazing temperature and subsequently cooling.

* * * * *